(12) United States Patent
Fanning

(10) Patent No.: US 10,898,845 B2
(45) Date of Patent: Jan. 26, 2021

(54) MOBILE DUST EXTRACTION DEVICE

(71) Applicant: Fanca Technologies Pty Ltd., Queensland (AU)

(72) Inventor: Andrew Fanning, Queensland (AU)

(73) Assignee: Fanca Technologies Pty Ltd., Queensland (AU)

( * ) Notice: Subject to any disclaimer, the term of this patent is extended or adjusted under 35 U.S.C. 154(b) by 0 days.

(21) Appl. No.: 15/701,756

(22) Filed: Sep. 12, 2017

(65) Prior Publication Data

US 2019/0030476 A1 Jan. 31, 2019

(30) Foreign Application Priority Data

Jul. 31, 2017 (AU) .............................. 2017101033
Jul. 31, 2017 (AU) .............................. 2017210486

(51) Int. Cl.
| | |
|---|---|
| *B01D 49/00* | (2006.01) |
| *B01D 50/00* | (2006.01) |
| *B01D 46/42* | (2006.01) |
| *B01D 45/08* | (2006.01) |
| *B01D 46/44* | (2006.01) |
| *B01D 46/00* | (2006.01) |
| *B01D 46/52* | (2006.01) |

(52) U.S. Cl.
CPC ........... *B01D 50/002* (2013.01); *B01D 45/08* (2013.01); *B01D 46/0041* (2013.01); *B01D 46/0086* (2013.01); *B01D 46/429* (2013.01); *B01D 46/446* (2013.01); *B01D 46/521* (2013.01); *B01D 2273/30* (2013.01); *B01D 2279/40* (2013.01)

(58) Field of Classification Search
CPC .............. B01D 50/002; B01D 46/0086; B01D 46/521; B01D 46/446; B01D 46/0041; B01D 46/429; B01D 45/08; B01D 2279/40; B01D 2273/30
See application file for complete search history.

(56) References Cited

U.S. PATENT DOCUMENTS 3,541,631 A 11/1970 Kluge
3,726,066 A * 4/1973 Colley ............... B01D 46/0068
55/302

(Continued)

FOREIGN PATENT DOCUMENTS

| AU | 2016101414 | 9/2016 |
| AU | 2016101414 A4 | 9/2016 |
| JP | 2009156509 A * | 7/2009 |

OTHER PUBLICATIONS

Extended European Search Report for corresponding European Application No. 18275065.3 dated Dec. 3, 2018.

(Continued)

*Primary Examiner* — Dung H Bui
(74) *Attorney, Agent, or Firm* — Wegman Hessler

(57) ABSTRACT

A mobile dust extraction device for filtering air, the mobile dust extraction device including a filter housing having at least one air filter, an inlet housing fluidly connected to the filter housing, a fan assembly including a fan, a fan inlet and a fan outlet, the fan assembly fluidly connecting the filter housing to the fan outlet, a support frame for supporting the filter housing, inlet housing and the fan assembly and a drive mechanism for propelling the mobile dust extraction device.

12 Claims, 3 Drawing Sheets

(56) References Cited

U.S. PATENT DOCUMENTS

| | | | | |
|---|---|---|---|---|
| 3,842,461 A * | 10/1974 | Wurster | ............. | B08B 5/04 15/326 |
| 3,870,489 A * | 3/1975 | Shaddock | ............. | B01D 46/06 15/328 |
| 3,885,932 A * | 5/1975 | Moore, Jr. | ............. | B01D 46/0068 55/314 |
| 3,927,988 A * | 12/1975 | Frazier | ............. | C09C 1/58 23/314 |
| 4,007,026 A * | 2/1977 | Groh | ............. | A47L 9/127 15/348 |
| 4,017,281 A * | 4/1977 | Johnstone | ............. | B01D 46/0057 15/340.1 |
| 4,166,406 A * | 9/1979 | Maughmer | ............. | F41G 5/14 89/1.815 |
| 4,218,226 A * | 8/1980 | Boozer | ............. | B01D 45/00 15/323 |
| 4,249,778 A * | 2/1981 | McGuire | ............. | E21C 35/223 299/12 |
| 4,270,466 A * | 6/1981 | Ansen | ............. | B02C 23/04 110/193 |
| 4,289,509 A * | 9/1981 | Holter | ............. | E21C 35/223 261/DIG. 54 |
| 4,336,041 A * | 6/1982 | Jolin | ............. | B01D 46/02 15/347 |
| 4,348,057 A | 9/1982 | Parenti | | |
| 4,490,162 A * | 12/1984 | Davis | ............. | B01D 50/002 15/352 |
| 4,869,737 A * | 9/1989 | Parenti | ............. | B01D 46/46 96/400 |
| 4,935,984 A * | 6/1990 | Bryant | ............. | E03F 7/10 134/167 C |
| 5,002,595 A * | 3/1991 | Kehr | ............. | E01H 1/0827 55/312 |
| 5,057,189 A * | 10/1991 | Apffel | ............. | C09C 1/482 202/113 |
| 5,062,868 A * | 11/1991 | Kennedy | ............. | B60P 1/60 15/340.1 |
| 5,142,732 A * | 9/1992 | Davis | ............. | B07B 7/01 15/340.1 |
| 5,154,742 A * | 10/1992 | Gault | ............. | B01D 45/08 55/315.2 |
| 5,597,393 A | 1/1997 | Johnson | | |
| 6,007,157 A * | 12/1999 | Stewart | ............. | E21C 35/223 299/10 |
| 6,354,023 B1 * | 3/2002 | Trahan | ............. | E01H 4/02 37/219 |
| 6,377,171 B1 * | 4/2002 | Fewel | ............. | B01D 29/117 340/522 |
| 9,873,142 B2 * | 1/2018 | Bjorge | ............. | E01C 23/088 |
| 2004/0168837 A1 * | 9/2004 | Michaud | ............. | B25J 5/005 180/9.46 |
| 2005/0016377 A1 * | 1/2005 | Brown | ............. | B01D 46/34 95/275 |
| 2006/0207230 A1 * | 9/2006 | DeMarco | ............. | B01D 45/08 55/319 |
| 2007/0066215 A1 * | 3/2007 | Song | ............. | B01D 46/0004 454/329 |
| 2009/0280718 A1 * | 11/2009 | Willett | ............. | A63H 17/18 446/470 |
| 2010/0010777 A1 * | 1/2010 | Farmer | ............. | B01D 46/0086 702/184 |
| 2011/0239861 A1 * | 10/2011 | Prud'homme | ............. | B01D 46/2411 95/107 |
| 2012/0239224 A1 * | 9/2012 | McCabe | ............. | B66F 9/063 701/2 |
| 2013/0197829 A1 * | 8/2013 | Sherman, III | ............. | B01D 46/0086 702/45 |
| 2015/0115988 A1 * | 4/2015 | Wang | ............. | G01R 31/2808 324/750.25 |
| 2015/0254958 A1 * | 9/2015 | Sherman | ............. | G08B 21/18 340/607 |
| 2016/0096131 A1 * | 4/2016 | Jones | ............. | B01D 46/002 95/22 |
| 2016/0116392 A1 * | 4/2016 | Carpenter | ............. | B01D 35/143 702/34 |

OTHER PUBLICATIONS

Supplementary European Search Report issued in European Patent Application No. 18275065.3 dated Dec. 3, 2018, 8 pages.

\* cited by examiner

MOBILE DUST EXTRACTION DEVICE

CROSS REFERENCE TO RELATED APPLICATIONS

This application claims the priority filing benefit of Australian Patent Application No. AU 2017210486 filed Jul. 31, 2017, and Australian Patent Application No. AU 2017101033 filed Jul. 31, 2017, both of which are incorporated herein by reference in their entirety.

FIELD OF INVENTION

The present invention relates to a mobile dust extraction device. Reference will be made in the specification to use of the invention for filtering air. This use is by way of example only and the invention is not limited to this use.

BACKGROUND OF THE INVENTION

Dust extraction systems are used to remove dust (including other airborne particulates) from an environment. Dust extraction is important as excess exposure to dust and particulates can cause illness and damage to lungs. Industrial premises such as factories that produce dust and airborne particulates typically have dedicated dust extraction systems.

Dedicated dust extraction systems are generally large purpose built systems that extract dust and particulates from captured air and exhaust cleaned air. A problem with these dedicated systems is that that they are installed at a particular location. Being in a fixed location, the extraction systems cannot adequately service other nearby locations should the industrial processes be relocated or new processes commenced. These fixed extraction systems are not transportable. The fixed extraction systems also require significant cost and time to install and decommission.

In some instances, the dust generating source can move and an extensive ducting system is required to connect the dust generating source to a dust extraction system. The moving dust generating source requires the ducting system to be continuously repositioned, this process is labour intensive and time consuming.

OBJECT OF THE INVENTION

It is an object of the present invention to overcome or at least alleviate one or more of the above mentioned problems with dust extraction systems and/or provide the consumer with a useful or commercial choice.

SUMMARY OF THE INVENTION

In one aspect the present invention broadly resides in a mobile dust extraction device for filtering air, the mobile dust extraction device including:
 a filter housing having at least one air filter;
 an inlet housing fluidly connected to the filter housing;
 a fan assembly including a fan, a fan inlet and a fan outlet, the fan assembly fluidly connecting the filter housing to the fan outlet;
 a support frame for supporting the filter housing, inlet housing and the fan assembly; and
 a drive mechanism for propelling the mobile dust extraction device.

The drive mechanism is preferably attached to the support frame. The drive mechanism preferably includes one or more drive motors to propel the mobile dust extraction device. The one or more drive motors is preferably one or more diesel motors. Each of the one or more diesel motors is preferably a variable speed diesel motor. Alternatively, each of the one or more drive motors may be a hydraulic motor, electric motor, internal combustion motor, or the like.

The drive mechanism preferably includes continuous tracks. More preferably the drive mechanism includes two continuous tracks. The two continuous tracks are preferably located on opposed lateral sides of the mobile dust extraction device. The two continuous tracks are preferably driven by the one or more drive motors. More preferably the two continuous tracks are driven by two hydraulic motors. Each of the two continuous tracks is preferably driven by a separate one of the two hydraulic motors. The continuous tracks preferably include a tread made of synthetic rubber reinforced with steel wires.

In one embodiment, the drive mechanism includes a plurality of wheels. Two of the plurality of wheels are preferably driven by the one or more drive motors.

The support frame preferably has substantially the same base dimensions as a 20' intermodal container. The support frame is preferably adapted to be transported on 20' intermodal container bolsters. The support frame preferably complies with ISO standard 668. The support frame preferably complies with ISO standard 1496-1.

The inlet housing preferably includes at least one inlet for introducing air. The inlet housing preferably includes at least one baffle plate. The at least one baffle plate preferably deflects the introduced air. The at least one baffle plate is preferably tilted in a backwards direction relative to the direction of flow of the introduced air through the at least one inlet.

Preferably the mobile dust extraction device further includes a hopper. The hopper is preferably located beneath the inlet housing. The hopper is preferably fluidly connected to the inlet housing. The hopper is preferably located beneath the filter housing. The hopper is preferably fluidly connected to the filter housing. More preferably the hopper is located beneath the inlet housing and the filter housing. The hopper preferably has a separator that inhibits flow of air between the inlet housing and the filter housing via the hopper. The hopper preferably collects dust that drops down from the inlet housing and from the filter housing.

Preferably the mobile dust extraction device further includes a conveyor. The conveyor is preferably located below the hopper. The conveyor is preferably fluidly connected to the hopper. The conveyor is preferably adapted to convey dust collected by the hopper towards a discharge outlet. The discharge outlet preferably discharges dust from the mobile dust extraction device. The conveyor is preferably an auger conveyor. The conveyor is preferably hydraulically driven. A valve is preferably located between the conveyor and the discharge outlet. The valve preferably inhibits air from being introduced into the mobile dust extraction device via the discharge port. The valve is preferably a rotary valve.

The fan is preferably driven by a motor. The motor is preferably a diesel motor. The diesel motor is preferably a variable speed diesel motor. Alternatively, the motor can be a hydraulic motor, electric motor, internal combustion motor, or the like.

The fan preferably produces a vacuum to move air through the mobile dust extraction device. The fan is preferably a centrifugal fan.

Each of the at least one air filter is preferably a fibrous media filter. More preferably each of the at least one air filter is a pleated fibrous media filter. In one embodiment, each of the at least one air filter is a pleated paper air filter.

Preferably the mobile dust extraction device further includes a controller to control the drive mechanism. The controller is preferably a wireless controller. In one embodiment, the controller is connected to the mobile dust extraction device by a control cable. The controller preferably controls the speed and direction of the mobile dust extraction device. In one embodiment, the controller controls the fan. More preferably the controller controls the speed of the fan. The controller preferably has a number of pre-set settings for the speed of the fan.

Preferably the dust extraction device further includes an air compressor. The air compressor is preferably located in an air compressor housing. The air compressor preferably provides compressed air which is blown across the at least one air filter to displace dust that has been filtered from the air. The displaced dust preferably drops down to the hopper.

Preferably the mobile dust extraction device further includes a computer processing unit (CPU). The CPU is preferably located in a control housing. The CPU is preferably adapted to control and monitor the mobile dust extraction device. The CPU is preferably adapted to control the fan. More preferably the CPU is adapted to control the motor that drives the fan. The CPU is preferably adapted to control the conveyor. The CPU is preferably adapted to control the valve. The CPU is preferably adapted to control the air compressor. The CPU is preferably adapted to monitor the fan. More preferably the CPU is adapted to monitor at least one sensor attached to the fan. The CPU is preferably adapted to control the drive mechanism. More preferably the CPU is adapted to control the drive mechanism in response to signals received from the controller.

The CPU is preferably adapted to monitor an emission sensor. More preferably the CPU is adapted to receive sensor readings from the emission sensor. The emission sensor is preferably located in or in fluid communication with the fan outlet. The emission sensor is preferably a broken bag detector.

The CPU is preferably adapted to monitor the at least one air filter. The CPU is preferably adapted to monitor airflow through the mobile dust extraction device. The mobile dust extraction device preferably includes differential pressure sensors. The differential pressure sensors are preferably located before and after the at least one air filter to indicate if the at least one air filter is blocked or if there are higher than normal dust readings. The CPU is preferably adapted to receive sensor readings from the differential pressure sensors The CPU is preferably adapted to communicate sensor readings to a remote device. The CPU is preferably adapted to communicate sensor readings to a remote device via a cellular network. In one embodiment, the CPU is adapted to communicate sensor readings to the controller. The sensor readings are preferably displayed on a screen of the controller.

In one embodiment the support frame has a plurality of extendable legs attached thereto, extendable between a raised position and a lowered position. Each of the plurality of extendable legs are preferably extendable in a vertical direction. Each of the plurality of extendable legs are preferably further extendable in a lateral direction relative to a longitudinal axis of the support frame. The plurality of extendable legs preferably assist in loading and unloading the mobile dust extraction device from a carrier such as a flatbed truck. The plurality of extendable legs are preferably retracted to allow movement of the mobile dust extraction device after it has been unloaded from the carrier. The plurality of extendable legs are preferably hydraulically extended and retracted. The CPU is preferably adapted to control the plurality of extendable legs.

Preferably the mobile dust extraction device further includes a hydraulic pump. The hydraulic pump preferably provides hydraulic force to extended and retracted the plurality of extendable legs. In one embodiment, the hydraulic pump provides hydraulic force to the one or more hydraulic drive motors. In another embodiment, the hydraulic pump provides hydraulic force to the hydraulic motor that drives the fan. The support frame preferably supports the hydraulic pump. The hydraulic pump is preferably driven by a motor. The motor that drives the hydraulic pump is preferably a diesel motor.

In a further aspect the present invention broadly resides in a mobile dust extraction device as described above for filtering air, the mobile dust extraction device including:

a filter housing having at least one air filter;

an inlet housing fluidly connected to the filter housing;

a fan assembly including a fan, a fan inlet and a fan outlet, the fan assembly fluidly connecting the filter housing to the fan outlet; and a support frame for supporting the filter housing, inlet housing and the fan assembly; and a drive mechanism attached to the support frame for propelling the mobile dust extraction device, wherein in use, the fan moves air from the inlet housing through the filter housing, through the fan inlet and out through the fan outlet, and wherein the at least one air filter filters the air.

In a further aspect, the present invention broadly resides in a method of filtering air, including the steps of:

fluidly connecting a movable dust generating source to a mobile dust extraction device;

introducing air from the movable dust generating source into the mobile dust extraction device;

moving the air through a filter housing having at least one air filter to filter the air; and moving the mobile dust extraction device, such that the mobile dust extraction device remains within a predetermined distance of the movable dust generating source.

The mobile dust extraction device is preferably a mobile dust extraction device as described in this specification.

Preferably the step of fluidly connecting a movable dust generating source to a mobile dust extraction device includes using ducting to fluidly join the dust generating source to the mobile dust extraction device.

Preferably the step of moving the mobile dust extraction device includes moving the mobile dust extraction device while air is being moved through the filter housing.

Preferably the step of moving the mobile dust extraction device includes controlling the movement of the mobile dust extraction device with a controller. The controller is preferably a wireless controller.

Preferably the method further includes the step of diverting the introduced air using a baffle plate.

Preferably the step of moving the air through a filter housing having at least one air filter to filter the air includes using a fan to move the air. Preferably the fan is a centrifugal fan.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
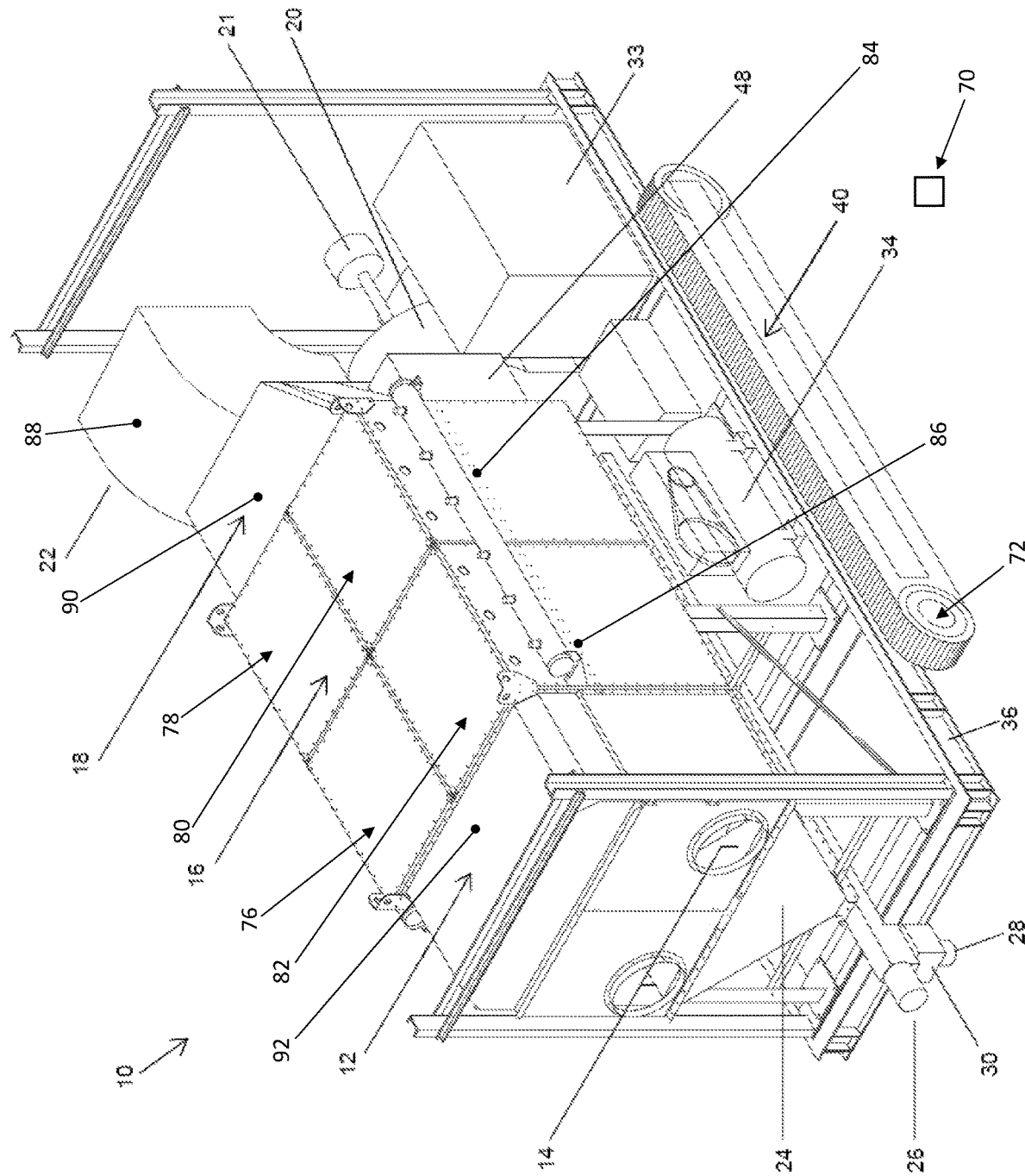
FIG. 1 is an isometric front view of a mobile dust extraction device according to an embodiment of the present invention.
Figure 2:
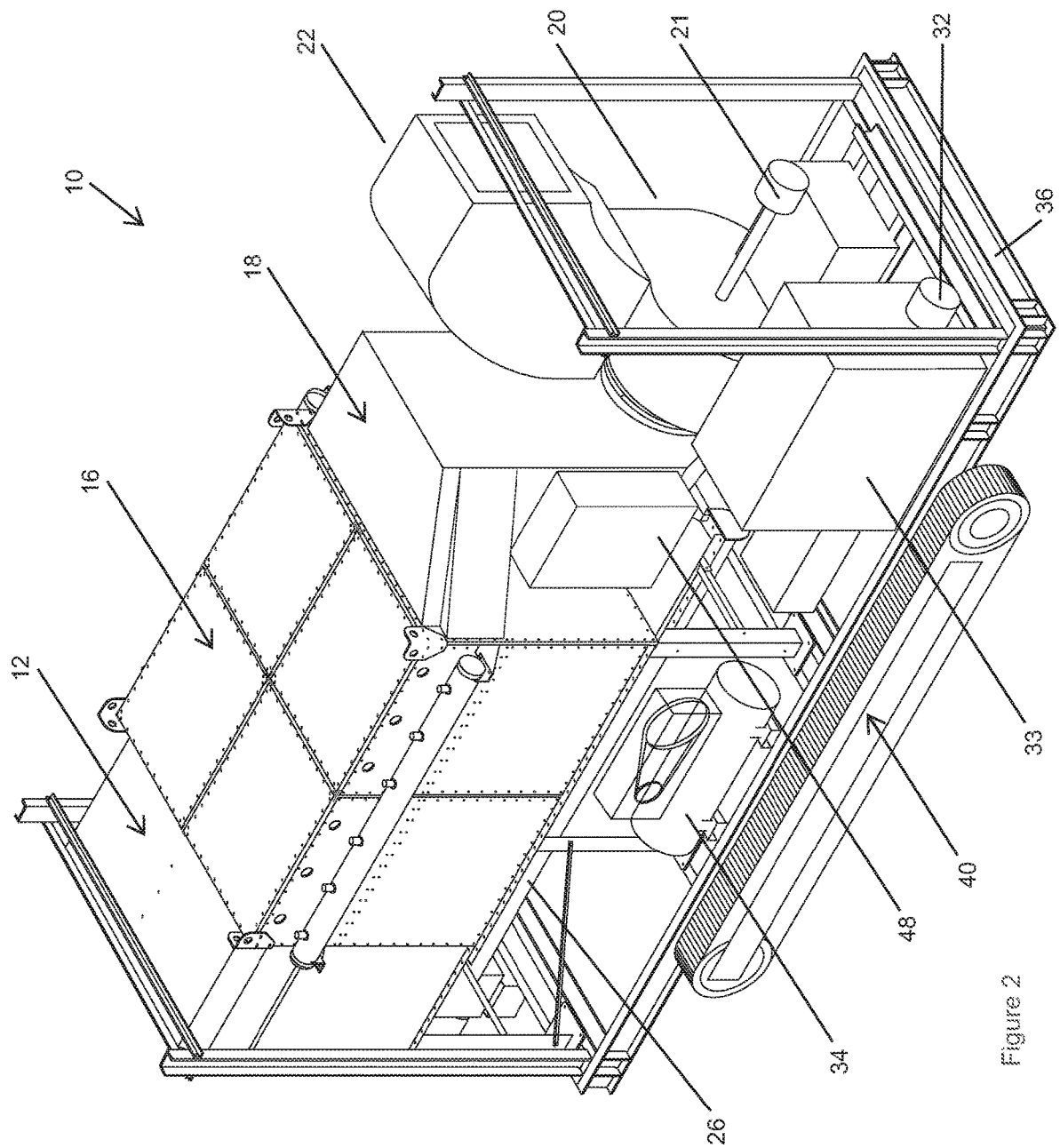
FIG. 2 is an isometric rear view of the mobile dust extraction device of FIG. 1.

With reference to FIGS. 1 and 2 there is shown a mobile dust extraction device 10. The mobile dust extraction device 10 has an inlet housing 12, having two inlets 14. The inlet housing 12 is fluidly connected to a filter housing 16 containing air filters 76,78,80,82. The filter housing 16 is fluidly connected to a fan inlet 18 of a fan in the form of a centrifugal fan 20, which is fluidly connected to a fan outlet in the form of an exhaust 22.

A hopper 24 is located beneath the inlet housing 12 and the filter housing 16 and fluidly connected to both the inlet housing 12 and the filter housing 16. A conveyor in the form of an auger conveyor 26 is located beneath the hopper 24. The auger conveyor 26 is connected to a discharge port 28 via a rotary valve 30.

A motor in the form of a diesel engine 33 drives a hydraulic pump 32. The hydraulic pump 32 drives a hydraulic motor 21 which drives the centrifugal fan 20.

The mobile dust extraction device 10 has an air compressor 34. The air compressor 34 is fluidly connected to the filter housing 16. The use of the air compressor 34 will be explained in greater detail below.

The mobile dust extraction device 10 has a frame 36. The frame 36 supports the inlet housing 12, the filter housing 16, the centrifugal fan 20, the hopper 24, the auger conveyor 26, the hydraulic pump 32 and the air compressor 34. The frame 36 has substantially the same base dimensions as a 20' intermodal container.

The mobile dust extraction device 10 has a drive mechanism in the form of two continuous tracks 40. The continuous tracks 40 are located on each lateral side of the mobile dust extraction device (only one side shown). The continuous tracks 40 are propelled by hydraulic motors 72 (only one side shown). The hydraulic pump 32 provides hydraulic force to the hydraulic motors 72.

The mobile dust extraction device 10 has a CPU in the form of a control unit 48. The control unit 48 controls the hydraulic pump 32, which drives the centrifugal fan 20. The control unit 48 controls the auger conveyor 26 and the rotary valve 30. The control unit 48 controls the air compressor 34. The control unit 48 monitors the centrifugal fan 20 using a sensor (not shown) to determine if the centrifugal fan 20 is rotating. The control unit 48 monitors the air leaving the exhaust 22 using an emission sensor 88. The control unit 48 monitors the air filters 76,78,80,82 using sensors 86,84 which measures the amount of dust on the air filters. The control unit 48 monitors the air flow through air filters 76,78,80,82 by receiving sensor readings from differential pressure sensors 92,90 before and after the air filters 76,78, 80,82. The control unit 48 controls the continuous tracks 40 in response to signals received from a wireless controller/ remote device 70. By controlling the continuous tracks 40, the control unit 48 can control the speed and direction of movement of the mobile dust extraction device 10.

In use with reference to FIGS. 1-2, the inlets 14 of the mobile dust extraction device 10 are fluidly connected to a moving dust generating source (such as a piece of earth moving machinery not shown) by ducting (not shown). The centrifugal fan 20 is driven by the hydraulic pump 32 to move air to be filtered from the moving dust generating source through the inlets 14, through the inlet housing 12, through the filter housing 16 and through the air filters 76,78,80,82, through the fan inlet 18, through the centrifugal fan 20 and out through the exhaust 22.

As the air moves through the inlet housing 12, heavier particles of dust that drop down are collected by the hopper 24. As the air moves through the air filters 76,78,80,82 in the filter housing 16, the dust that is filtered by the air filters 76,78,80,82 and drops down is collected by the hopper 24. The dust collected by the hopper 24 is funnelled down to the auger conveyor 26, which conveys the dust to the discharge port 28. The rotary valve 30 enables the dust to discharge from the discharge port 28 while inhibiting air from being sucked into the mobile dust extraction device 10 via the discharge port 28.

As dust collects on the air filters 76,78,80,82, compressed air from the air compressor 34 is blown across the air filters 76,78,80,82 to dislodge the dust. The dislodged dust then falls down towards the hopper 24.

As the moving dust generating source moves, the mobile dust extraction device 10 is moved by the continuous tracks 40 to remain within proximity of the moving dust generating source. The continuous tracks 40 are controlled by a person (not shown) through the use of a wireless controller 70 that is in communication with the control unit 48. The direction of the mobile dust extraction device 10 is controlled through skid steering.

Figure 3:
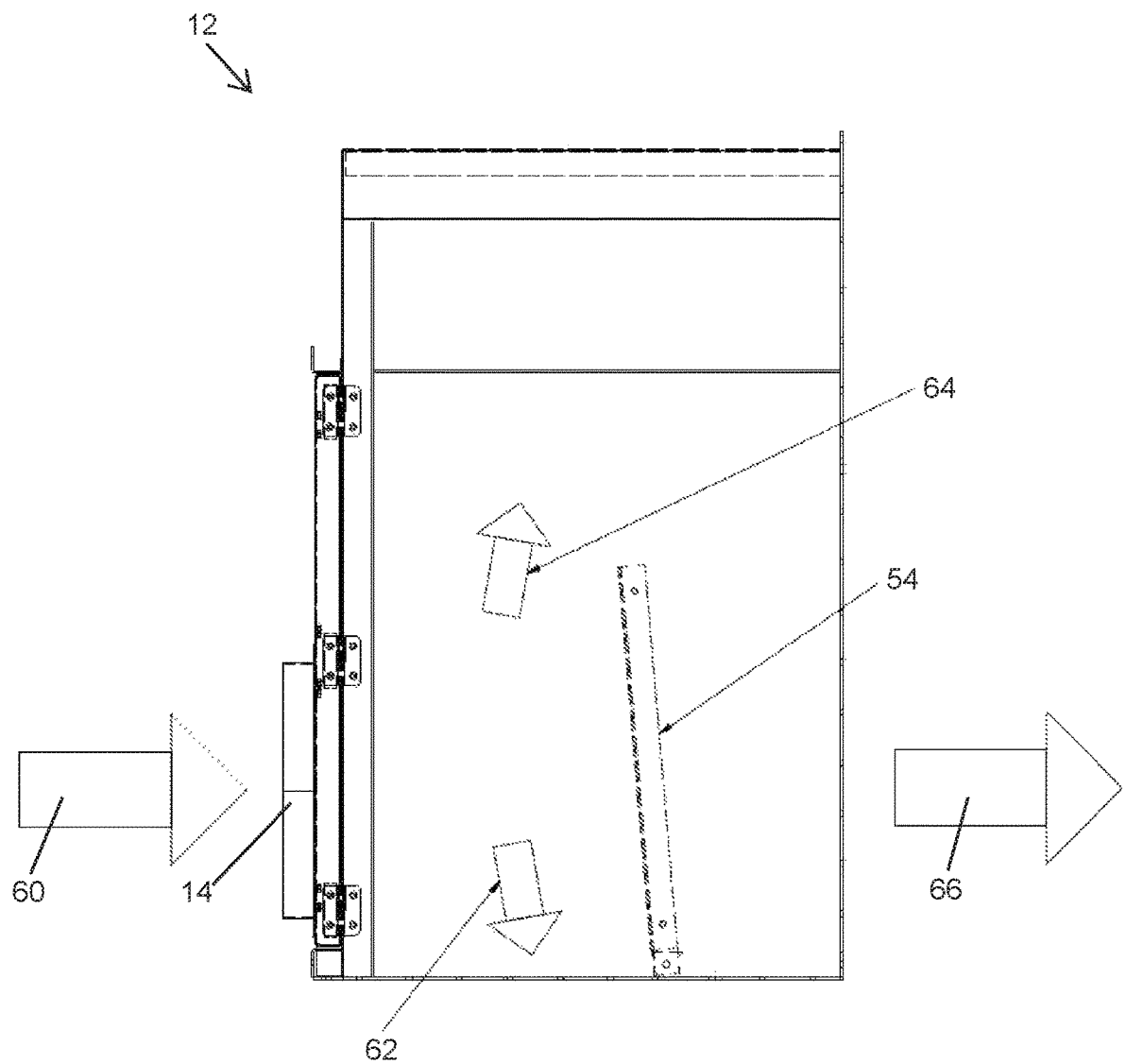
FIG. 3 is a schematic side view of an inlet housing according to an embodiment of the present invention.

With reference to FIG. 3, there is shown a side view of the inlet housing 12. The inlet housing 12 has a baffle plate 54 (shown in dotted line format). The baffle plate 54 is tilted towards the inlets 14 of the inlet housing 12.

In use with reference to FIG. 3, the air entering the inlet housing 12 through inlets 14 (indicated by arrow 60) is deflected by the baffle plate 54. Heavy dust particles (indicated by arrow 62) drop towards the bottom of the inlet housing 12 and into the hopper 24 (best seen in FIG. 1). Lighter dust particles (as indicated by arrow 64 are carried by the air over the baffle plate 54 and leave the inlet housing 12 (as indicated by arrow 66). The lighter dust particles are then filtered by air filters 76,78,80,82 in the filter housing 16 (best seen in FIGS. 1-2).

ADVANTAGES

An advantage of the preferred embodiment of the mobile dust extraction system includes that the mobile dust extraction system can be easily transported and can be operational in a very short period of time. An advantage of having a diesel or petrol motor powering the fan is that the mobile dust extraction system does not require an external power supply such as a mains connection. A further advantage of the preferred embodiment of the mobile dust extraction system includes the ability to relocate during operation. Another advantage of the preferred embodiment of the mobile dust extraction system includes the ability to be used with moving equipment. Another advantage of the preferred embodiment of the mobile dust extraction system is that there is no requirement for long and expensive ducting between the dust generating source and the mobile dust extraction system.

VARIATIONS

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A mobile dust extraction device for filtering air, the mobile dust extraction device including:
    a filter housing having at least one air filter;
    an inlet housing fluidly connected to the filter housing;
    a fan assembly including a fan, a fan inlet and a fan outlet, the fan assembly fluidly connecting the filter housing to the fan outlet;
    a support frame for supporting the filter housing, inlet housing and the fan assembly;
    a drive mechanism for propelling the mobile dust extraction device
    a hopper;
    an auger conveyor;
    a discharge port; and
    a valve located between the auger conveyor and the discharge port,
    wherein in use the hopper funnels dust from the inlet housing and the filter housing to the auger conveyor and the auger conveyor conveys the dust to the discharge port.

2. A mobile dust extraction device as claimed in claim 1, wherein the drive mechanism includes two continuous tracks.

3. A mobile dust extraction device as claimed in claim 2, wherein the two continuous tracks are driven by two hydraulic motors.

4. A mobile dust extraction device as claimed in claim 1, wherein the drive mechanism is attached to the support frame.

5. A mobile dust extraction device as claimed in claim 1, wherein the drive mechanism is controlled by a wireless controller.

6. A mobile dust extraction device as claimed in claim 1, wherein the support frame has substantially the same base dimensions as a 20' intermodal container.

7. A mobile dust extraction device as claimed in claim 1, wherein the inlet housing includes at least one baffle plate.

8. A mobile dust extraction device as claimed in claim 1, further including an emission sensor in fluid communication with the fan outlet, and a CPU to receive sensor readings from the emission sensor.

9. A mobile dust extraction device as claimed in claim 8, further including differential pressure sensors located before and after the at least one air filter, wherein the CPU receives sensor readings from the differential pressure sensors.

10. A mobile dust extraction device as claimed in claim 9, wherein the CPU communicates the sensor readings to a remote device.

11. A mobile dust extraction device for filtering air, the mobile dust extraction device including:
    a filter housing having at least one air filter;
    an inlet housing fluidly connected to the filter housing;
    a fan assembly including a fan, a fan inlet and a fan outlet, the fan assembly fluidly connecting the filter housing to the fan outlet; and
    a support frame for supporting the filter housing, inlet housing and the fan assembly;
    a drive mechanism attached to the support frame for propelling the mobile dust extraction device;
    a hopper;
    an auger conveyor;
    a discharge port; and
    a valve located between the auger conveyor and the discharge port,
        wherein in use, the fan moves air from the inlet housing through the filter housing, through the fan inlet and out through the fan outlet, and wherein the at least one air filter filters the air, and wherein in use the hopper funnels dust from the inlet housing and the filter housing to the auger conveyor and the auger conveyor conveys the dust to the discharge port.

12. A mobile dust extraction device as claimed in claim 11, wherein the drive mechanism includes two continuous tracks.

* * * * *